United States Patent [19]
Tomasini et al.

[11] Patent Number: 5,710,811
[45] Date of Patent: Jan. 20, 1998

[54] SPEECH CIRCUIT FOR SUBSCRIBER TELEPHONE APPARATUS

[75] Inventors: Luciano Tomasini, Monza; Rinaldo Castello, Arcore; Ivan Bietti, Casal Romano; Giancarlo Clerici, Vimodrone, all of Italy

[73] Assignee: SGS-Thomson Microelectronics, S.r.l., Agrate Brianza, Italy

[21] Appl. No.: 633,843

[22] Filed: Apr. 10, 1996

[30] Foreign Application Priority Data

Apr. 11, 1995 [EP] European Pat. Off. ............ 95830138

[51] Int. Cl.$^6$ ........................................... H04M 1/00
[52] U.S. Cl. ..................... 379/394; 379/394; 379/391; 379/392
[58] Field of Search ..................... 379/394, 391, 379/392, 398, 387, 399, 402; 333/173

[56] References Cited

FOREIGN PATENT DOCUMENTS 0394012  4/1990  European Pat. Off. .
0579891  7/1992  European Pat. Off. .

OTHER PUBLICATIONS

Castello, et al., "A BiCMOS Speech Circuit With Only Two External Components," IEEE Journal of Solid–State Circuits, vol. 28, No. 7, Jul. 1993, NY, pp. 770–777.

*Primary Examiner*—Dwayne Bost
*Assistant Examiner*—Keith Ferguson
*Attorney, Agent, or Firm*—Robert Groover; Betty Formby; Matthew S. Anderson

[57] ABSTRACT

The speech circuit matches the impedance of the telephone line by synthesizing a complex impedance using a positive feedback loop which has a single resistor (11), and cancels out the side tone using a subtractor (20') which extracts from the signal (Va) coming from the line a signal (Vb) correlated to the signal to be transmitted. In order to achieve cancellation of the side tone unaffected by the noise produced in the impedance synthesizing circuits, the signal (Vb) is derived by processing the signal present in the resistor (11) at the output of the feedback loop.

10 Claims, 3 Drawing Sheets

SPEECH CIRCUIT FOR SUBSCRIBER TELEPHONE APPARATUS

CROSS-REFERENCE TO RELATED APPLICATION

This application claims priority from provisional 60/007,716 filed Nov. 30, 1995 and EPC Application 95830138.4 filed Apr. 11, 1995, both of which are hereby incorporated by reference.

BACKGROUND AND SUMMARY OF THE INVENTION

The present invention relates to subscriber telephone apparatus and, more particularly, to speech circuits for such apparatus.

As is known, the speech circuit of a telephone has the general function of connecting to a two-wire telephone line both the generator of local signals to be sent on the line and the receiver of signals coming from the line. In particular, it has to perform two basic functions: matching the line impedance and cancelling out the side tone, that is, the effect by which the person speaking on the telephone hears his own voice in the earpiece.

A very widespread speech circuit is that which uses a Wheatstone bridge. As well as the side tone, it can also effectively attenuate the noise of the transmission circuits of the local signal generator and that of most of the circuits involved. A speech circuit of this type which is suitable for production as an integrated circuit is described, for example, in an article entitled "A programmable speech circuit suitable for telephone transducers" published in the IEEE JOURNAL OF SOLID-STATE CIRCUITS, Vol. SC-17, No. 6, December 1982, pages 1149–1157, which is hereby incorporated by reference In order to reduce as far as possible the number of electrical components outside the integrated circuit, and thus to reduce the overall size of the telephone apparatus, speech circuits have been developed in which the two functions described above are carried out by methods other than that on which the bridge circuit is based. For example, the circuit described in European patent application EP 0579891 (which was filed by the Applicant on Jul. 7, 1992, and which is hereby incorporated by reference) achieves impedance matching by synthesizing a complex impedance as the termination impedance of the speech circuit by means of a positive feedback loop comprising a single resistor and attenuates the side tone by means of a subtractor which subtracts a signal derived directly from the transmission generator from the signal coming from the line so as to provide the receiver with a signal which is not affected by the transmitted signal.

It has been found that the attenuation of the side tone thus achieved is satisfactory but requires the noise generated by the components of the feedback loop and of the transmission circuits to be low. This requirement is difficult to satisfy particularly if, amongst these components, there are filters formed by the so-called switched capacitor technique, as is the case when the number of components outside the integrated circuit is to be reduced to a minimum. In fact, in order to keep the noise of these filters low enough, the overall capacitance of the capacitors used has to be quite high; however, this involves the use of a correspondingly large area of the "chip" on which the integrated circuit is formed.

The object of the present invention is to provide a speech circuit which uses a positive feedback loop such as that described above in order to synthesize a complex termination impedance, but which achieves cancellation or at least effective attenuation of the side tone and which is unaffected by the noise produced in the feedback loop and in the transmission circuits and can therefore be formed in a small area in the integrated circuit.

This object is achieved, according to the invention, by the provision of the speech circuit as described below and in the following claims.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
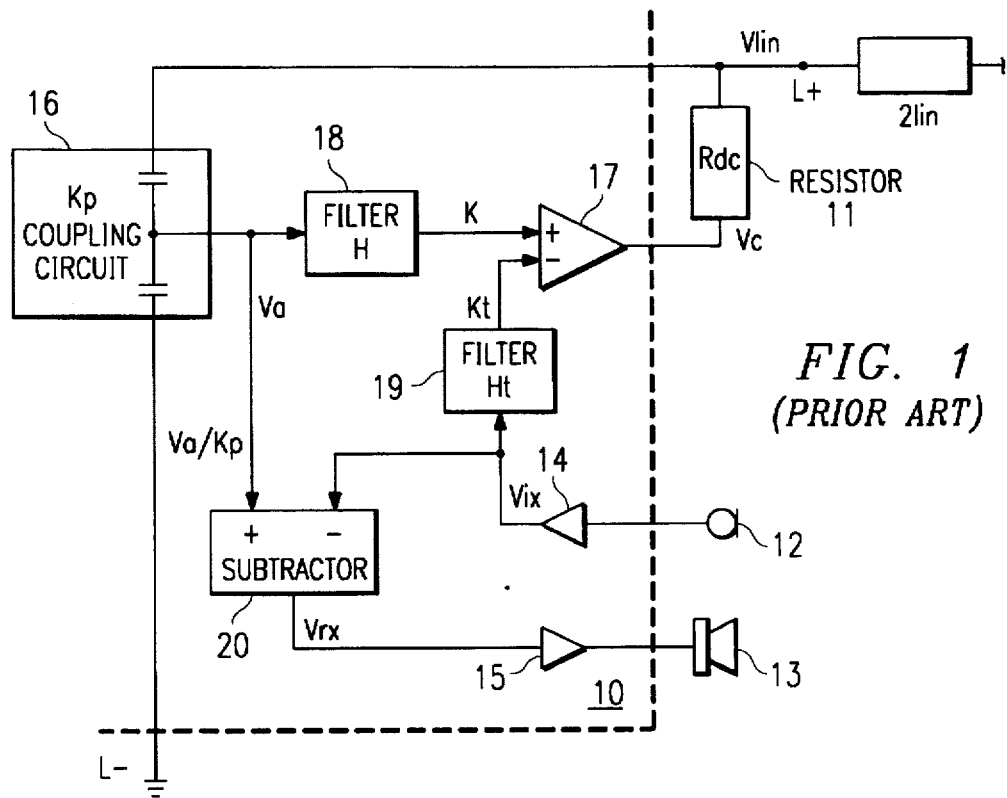
FIG. 1 is a block diagram showing the speech circuit described in the European patent application indicated above.

The numerous innovative teachings of the present application will be described with particular reference to the presently preferred embodiment (by way of example, and not of limitation), in which:

The known circuit shown in FIG. 1 has two terminals, indicated L– and L+ for connection to a telephone line, represented by its impedance Zlin, and comprises an integrated circuit 10 and some external components, of which a resistor 11, a microphone 12 and a receiver unit 13 are shown.

In the drawing, one of the line terminals (L–) is connected to a fixed potential, indicated by the ground symbol, but it will be evident to the person skilled in the art of telecommunications that this is only a device to simplify the description, since in practice the telephone signal is a differential signal, i.e., it causes a variation of the potentials of both of the wires of the line.

The integrated circuit 10 comprises a microphone-signal amplifier and a received-signal amplifier, indicated 14 and 15, respectively, which, together with the microphone 12 and the receiver unit 13, constitute the transmission generator and the receiver of the telephone apparatus, respectively. It also comprises a circuit for coupling the generator and the receiver to the line.

This coupling circuit comprises a block 16 which contains a capacitive coupler with a transfer function Kp, which is connected between the line terminals L+ and L–, and outputs a signal (Va) correlated to the signal (Vlin) present between the line terminals, and which therefore has the function of detecting the line signal.

The coupling circuit also comprises an adder 17 with two inputs, of which one is connected to the output of the capacitive coupler 16 by means of a filter 18 with a transfer function H and the other is connected to the output of the transmission amplifier 14 by means of a second filter 19 with a transfer function Ht. The adder 17 has a transfer function K for the input connected to the filter 18 and, together with the filter 18, thus constitutes a first processing and filtering circuit unit with a transfer function H.K, and a transfer function Kt for the input which is connected to the filter 19 so as to constitute, together with the filter 19, a second processing and filtering circuit unit with a transfer function Ht.Kt. The output of the adder 17 is connected to the line terminal L+ by means of the resistor 11. The adder 17 has a very low output impedance so that the resistor 11 can be considered to be connected directly between the line terminals and the current flowing through it is thus substantially equal to the line current. It can be shown that, in order to have a flat gain when the termination impedance synthesized is equal to the line impedance Zlin, the transfer function between the input (Vtx) of the filter 19 and the output (Vc) of the adder 17 is equal to 2Rdc/Zlin.

The output of the capacitive coupler 16 and the output of the transmission amplifier 14 are connected to the inputs of a subtractor 20, the output of which is connected to the input of the receiver amplifier 14. The subtractor 20 is formed so as to multiply the signal coming from the coupler 16 by 1/Kp.

In order to be integrated easily, the filter 18 is preferably formed by the switched capacitor technique and is formed in a manner such that its transfer function H is programmable in dependence on the impedance of the line to which the telephone apparatus is to be connected.

The block 16 with the function of a capacitive coupler is also in practice a filter with switched capacitors designed to block signals with frequencies below 5 Hz and high-frequency signals (>80 kHz) extraneous to the telephone signal (due to the switching of the capacitors of the filters).

The filter 19 is also of the switched capacitor type. It has a transfer function Ht which achieves a flat gain, that is, a uniform gain for all the useful frequencies of the signal to be transmitted, when the speech circuit is matched to the line, that is, when the termination impedance is substantially equal to that of the line.

As explained in the European patent application indicated above, the capacitive coupler 16, the filter 18, the adder 17 and the resistor 11 together constitute a positive feedback loop with a gain of less than 1, which is consequently stable, having the function of creating a complex impedance between the line terminals. This impedance depends upon the resistance Rdc of the resistor 11 and upon the transfer function Kp.H·K. It can be shown that this transfer function is equal to (Zlin−Rdc)/Zlin if a termination impedance of the speech circuit equal to the line impedance Zlin is to be synthesized.

The subtractor 20 receives as inputs the signal Vtx supplied by the transmission generator at the output of the amplifier 14 and the output signal (Va) of the capacitive coupler 16, which is divided by Kp. This signal contains, superimposed on the signal (Vlin) coming from the line, the signal to be transmitted on the line, which is input to the adder 17 by the transmission generator through the filter 19. The subtractor subtracts from this signal the signal (Vtx) produced by the transmission generator and thus outputs only the useful signal (Vrx) to be received which is then amplified by the amplifier 15 and applied to the unit 13.

As already stressed, the cancellation of the side tone thus achieved is good as long as the noise generated by the components of the feedback loop, by the filter 19 and by the adder 17 is low, which in practice, is not the case, particularly if switched capacitor filters are used.

Figure 2:
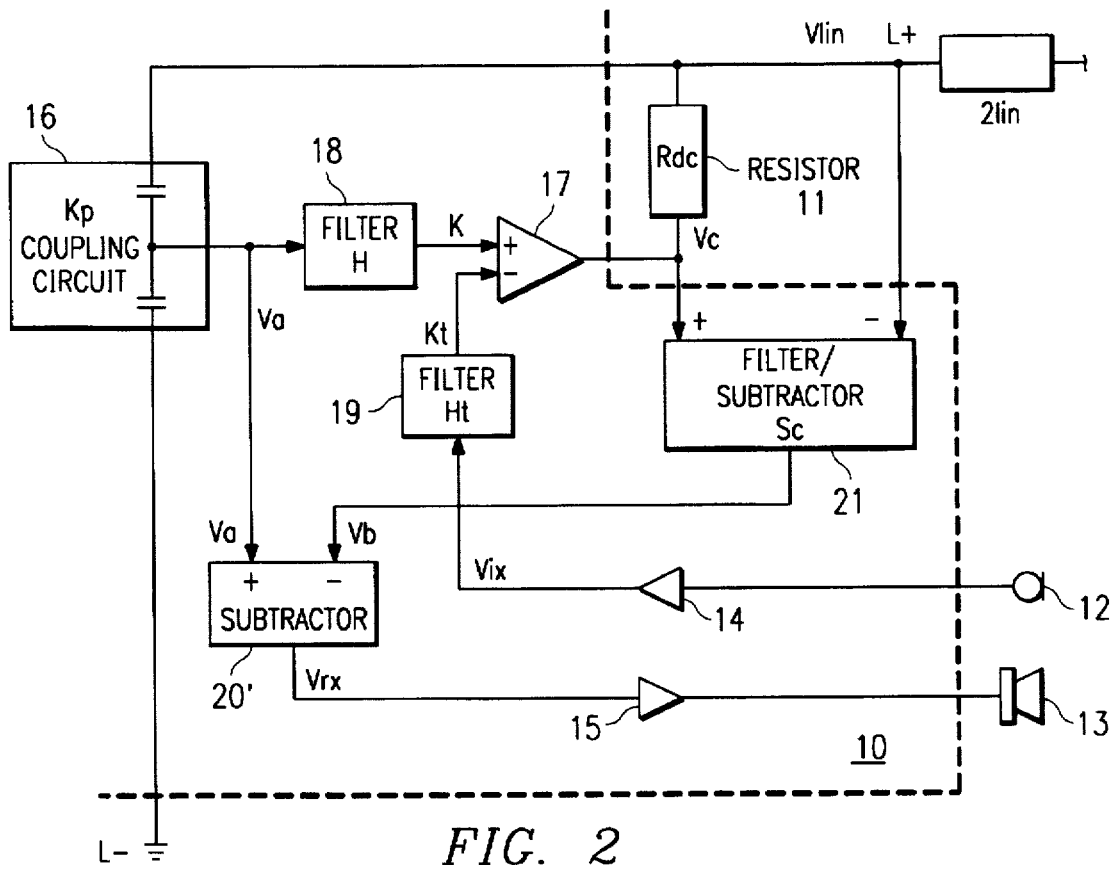
FIG. 2 is a block diagram showing a speech circuit according to the invention.

The circuit according to the invention which is shown in FIG. 2, in which blocks with the same reference numerals as in FIG. 1 have the same functions, will now be considered.

It can be noted that the structure with the positive feedback loop for synthesizing a complex impedance and the circuit unit with a transfer function independent of frequency, which connects the transmission generator 12, 14 to the line, are unchanged from the known circuit but the structure of the portion of the circuit which performs the function of cancelling out the side tone is substantially different.

For this function, there is an additional block, indicated 21, which is essentially a switched-capacitor filter with a subtractor input stage having its two inputs connected to the terminals of the resistor 11 and its output connected to a subtractor 20'. The subtractor 20' corresponds to the subtractor 20 of FIG. 1, but unlike that subtractor, it does not multiply the signal Va coming from the capacitive coupler 16 by 1/Kp but has a gain equal to 1 for that signal.

The transfer function Sc of the filter/subtractor 21 is obtained by the following calculation, in which Vc and Vlin are the input signals of the filter and Vb is the output signal:

$$Vb = Sc \cdot (Vc - Vlin) \tag{1}$$

If the impedance of the capacitive coupler 16 is considered negligible compared with the line impedance Zlin, which is equal to the termination impedance of the speech circuit when it is matched to the line, it can easily be shown that $$Vlin = \frac{Zlin}{Zlin + Rdc} \cdot Vc. \tag{2}$$

By substituting (2) into (1), one obtains:

$$Vb = Sc \cdot \left( \frac{Zlin + Rdc}{Zlin} - 1 \right) \cdot Vlin = Sc \cdot \frac{Rdc}{Zlin} \cdot Vlin. \tag{3}$$

In order to cancel out the side tone the input signals of the subtractor 20', Va=Kp·Vlin and Vb must be equal, that is, (3) must be equal to Kp·Vlin. Thus:

$$Kp \cdot Vlin = Sc \cdot \frac{Rdc}{Zlin} \cdot Vlin$$

from which:

$$Sc = Kp \cdot \frac{Zlin}{Rdc}$$

which is the transfer function sought.

As can be seen, the function of cancelling out the side tone is independent of the parameters which determine the impedance synthesis and therefore of the accuracy with which this synthesis operation is carried out. Moreover, the noise generated by the components upstream of the resistor 11, particularly that due to the filters in the blocks 16, 18 and 19, is attenuated in the same way in which the side tone is attenuated. The only noise which is not cancelled out is that introduced by the capacitive coupler 16 and by the filter/subtractor 21 which, however, is negligible in comparison with the noise which is cancelled out. This result is based on the fact that the phase of the voltage which falls in the resistor 11 is inverted when changing from transmission to reception or vice versa.

It can be shown that the signal coming from the line is not attenuated by the speech circuit according to the invention. In particular, the signal Vrx output by the subtractor 20', the transfer function of the subtractor being indicated Hsotr, is:

$$Vrx = 2 \cdot Kp \cdot Hsotr \cdot Vlin.$$

Thus if one sets Kp=1 and Hsotr=1, which values can easily be approximated in practice, the signal coming from the line is amplified by 6 dB as can easily be verified from the equation given above. As a result, the amplification necessary to obtain a useful signal in the unit 13 is less than that which was necessary with the known circuit. This means that the noise output by the subtractor 20' which, as has been seen, is in any case considerably less than that which was at the output of the subtractor 20 of the known circuit, is amplified less.

Finally, it is clear from the foregoing that, as far as the attenuation of noise is concerned, the performance of the circuit according to the invention is decidedly better than that of the known circuit described in the European patent application cited above and is practically the same as that of the known Wheatstone bridge circuit which, from this point of view, is the best which can be achieved and, as regards the processing of the signal received, the circuit according to the invention is more advantageous not only than the circuit described in the European patent application, but also than the Wheatstone bridge circuit. In fact, in this latter circuit, the signal coming from the line is picked up at the terminals of a resistor which has to have a very low resistance (in practice a few tens of ohms) in order not to affect the termination impedance and must therefore be subject to high amplification, whereas, in the circuit according to the invention, the signal coming from the line is picked up on a resistor (Rdc) which can have a much higher resistance (for example 250 ohms) and thus requires only correspondingly lower amplification. This is clearly an advantage for the quality of the useful signal which arrives in the receiving unit since the noise, which is amplified together with the signal received, is also amplified less. In other words, the signal/noise ratio is higher with the circuit according to the invention.

Figure 3:
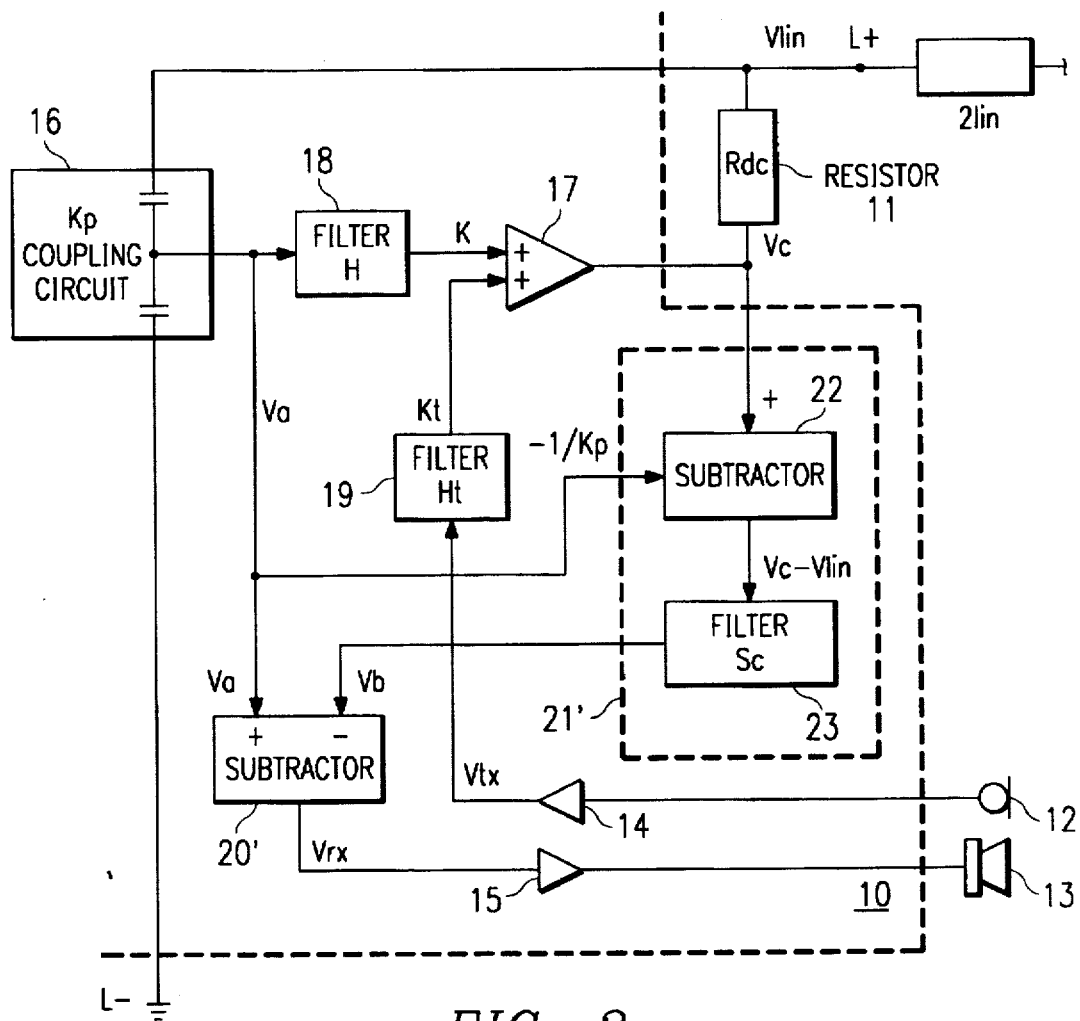
FIG. 3 shows a variant of the circuit of FIG. 2.
Figure 4A:
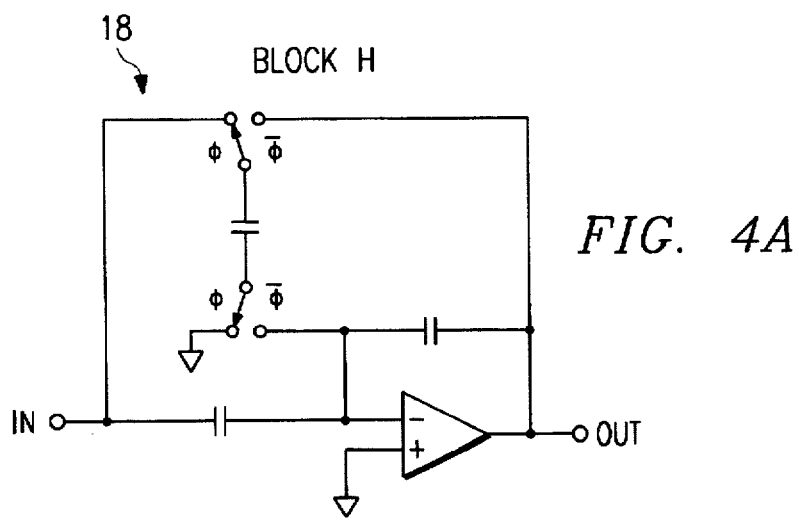
FIGS. 4a through 4d show sample implementations of the SC filters 18, 19, 20, and 21, respectively.
Figure 4B:
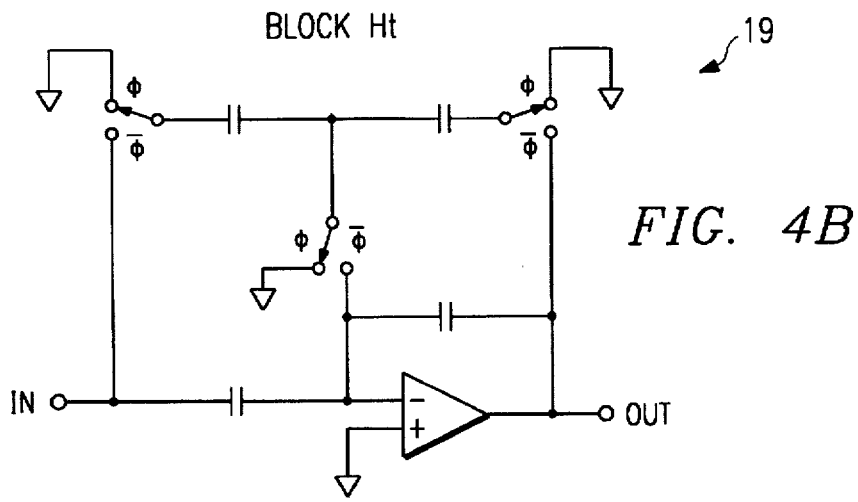
Figure 4C:
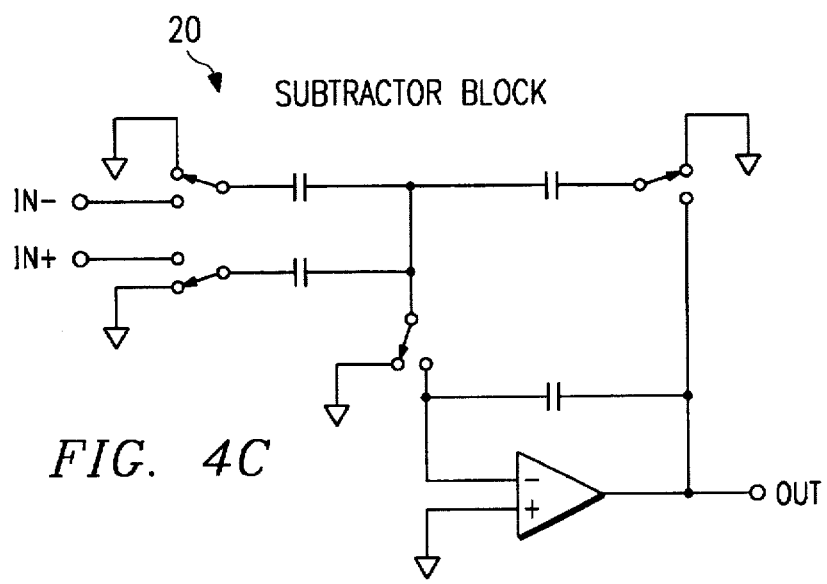
Figure 4D:
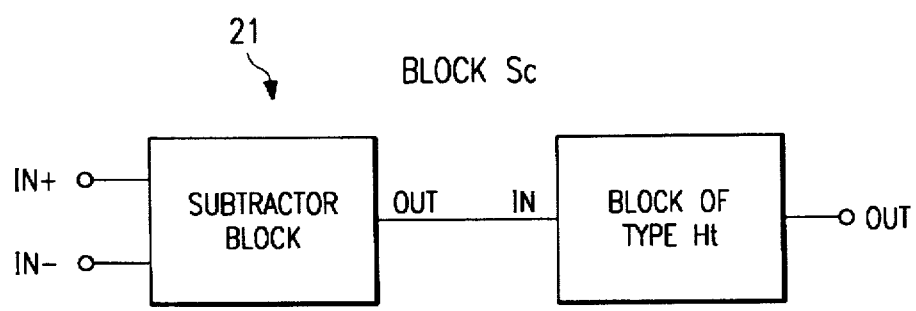

Finally, the variant shown in FIG. 3 will be considered. In this circuit, the signal coming from the line to be sent for reception is picked up downstream of the coupler 16. This signal Va is applied to a first input of a second subtractor, indicted 22, which has a second input connected to the connection point between the output of the adder 17 and the resistor 11. The subtractor 22 has a gain of 1/Kp for the first input and a gain of 1 for the second input. The output of the subtractor is connected to the first subtractor 20' by means of a filter 23 which has the same transfer function as the filter/subtractor 21 of the circuit of FIG. 2. The second subtractor 22 and the filter 23 are shown inside a rectangle, indicated 21', to indicate that they have a function equivalent to that of the filter/subtractor 21 of the circuit of FIG. 2.

It can easily be seen that the output of the second subtractor 22 is Vc−Vlin so that the input signal of the first subtractor is again Vb. This variant may be more advantageous because it is easier to process a signal relative to a fixed direct-current point such as the output signal of the capacitive coupler 16 rather than a variable signal such as that at the line terminal L+ which, moreover, is at a much higher voltage.

FIGS. 4a–4d show sample implementations of the SC filters 18, 19, 20, and 21, respectively. Block 16, like block 20, is preferably a subtractor.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A speech circuit for subscriber telephone apparatus, comprising:

two line terminals for connection to a two-wire telephone line, a signal generator for generating signals for transmission on said telephone line, a receiver for receiving signals coming from said telephone line, a circuit for coupling said signal generator and said receiver to said telephone line, comprising:

means for detecting said signals coming from said telephone line, said means for detecting being connected to said line terminals and having an output terminal, a resistor connected to the line terminals so that a current substantially equal to the line current passes through it, first processing and filtering means which are connected between said output terminal of said means for detecting and said resistor and, in combination with said means for detecting and with said resistor, can constitute a positive feedback loop for the formation of a complex termination impedance, second processing and filtering means connected between said signal generator and said resistor for applying said signal to be transmitted to said telephone line, through said resistor, and a subtractor having a first input connected to said output terminal of said means for detecting in order to receive a signal correlated to said signal coming from said telephone line, a second input to which is applied a signal correlated to said signal to be transmitted, and an output connected to said receiver, said subtractor being able to output a signal representing the difference between the signals on said first and second inputs, characterized in that it comprises a filter/subtractor having a first input connected to the connection point between said first processing and filtering means and said resistor, a second input connected to a point on the path of said signal coming from said telephone line, and an output connected to said second input of said filter/subtractor to supply it with said signal correlated to said signal to be transmitted.

2. The speech circuit of claim 1, connected to a telephone line, in which, when the termination impedance is equal to the line impedance the following relationships are valid:

$$Kp \cdot H \cdot K = (Zlin - Rdc)/Zlin, \text{ and}$$

$$Sc = Kp \cdot Zlin/Rdc;$$

where Kp represents the transfer function of the means for detecting the signal coming from said telephone line, H.K represents the transfer function of said first processing and filter means Zlin represents the impedance of said telephone line, Rdc represents the resistance of the resistor, and Sc represents the transfer function of said second subtractor.

3. The speech circuit of claim 1, in which said point on the path of said signal coming from said telephone line is the connection point of said resistor to one of said line terminals.

4. The speech circuit of claim 2, in which said point on the path of said signal coming from said telephone line is the connection point of said resistor to one of said line terminals.

5. The speech circuit of claim 1, in which said point on the path of said signal coming from said telephone line is said output terminal of said means for detecting said signal coming from said telephone line.

6. The speech circuit of claim 2, in which said point on the path of said signal coming from said telephone line is said output terminal of said means for detecting said signal coming from said telephone line.

7. The speech circuit of claim 5 in which said filter/subtractor has a gain of 1 for the signal applied to said first input and a gain of 1/Kp for the signal applied to said second input, where Kp is the transfer function of means for detecting.

8. The speech circuit of claim 6 in which said filter/subtractor has a gain of 1 for the signal applied to said first input and a gain of 1/Kp for the signal applied to said second input, where Kp is the transfer function of said means for detecting.

9. An audio processing system, comprising:

first and second input terminals connected to a communication line;

a signal detection circuit connected to detect a signal at said first and second terminals;

an audio input circuit for receiving audio to be transmitted on the line;

an audio output circuit for generating audio from signals received on the line;

a first signal processor having an input connected to said signal detection circuit;

a second signal processor having an input connected to said audio input circuit;

a signal adding circuit having first and second inputs connected to respective outputs of said first and second signal processors;

a load connected between said first input and a node which receives an output of said signal adding circuit;

a first subtractor connected to said node to receive the output of said adding circuit on a first input and said signal on a second input, and to provide an output which is the difference between said output of said adding circuit and said signal at said first input terminal;

a second subtractor connected to receive the output of said first subtractor on a first input and the output of said signal detection circuit on a second detection circuit and to output a signal to said receiver.

10. The audio processing system of claim 9, wherein said first subtractor has a gain of 1 for the signal applied to its first input and a gain of 1/Kp for the signal applied to its second input, where Kp is the transfer function of the detection means.

* * * * *